July 21, 1931.　　　　C. C. BENNETT　　　　1,815,180
AXLE PRESS
Filed Oct. 21, 1929　　　5 Sheets-Sheet 1

Inventor
Claude C. Bennett
By Reynolds & Reynolds
Attorneys

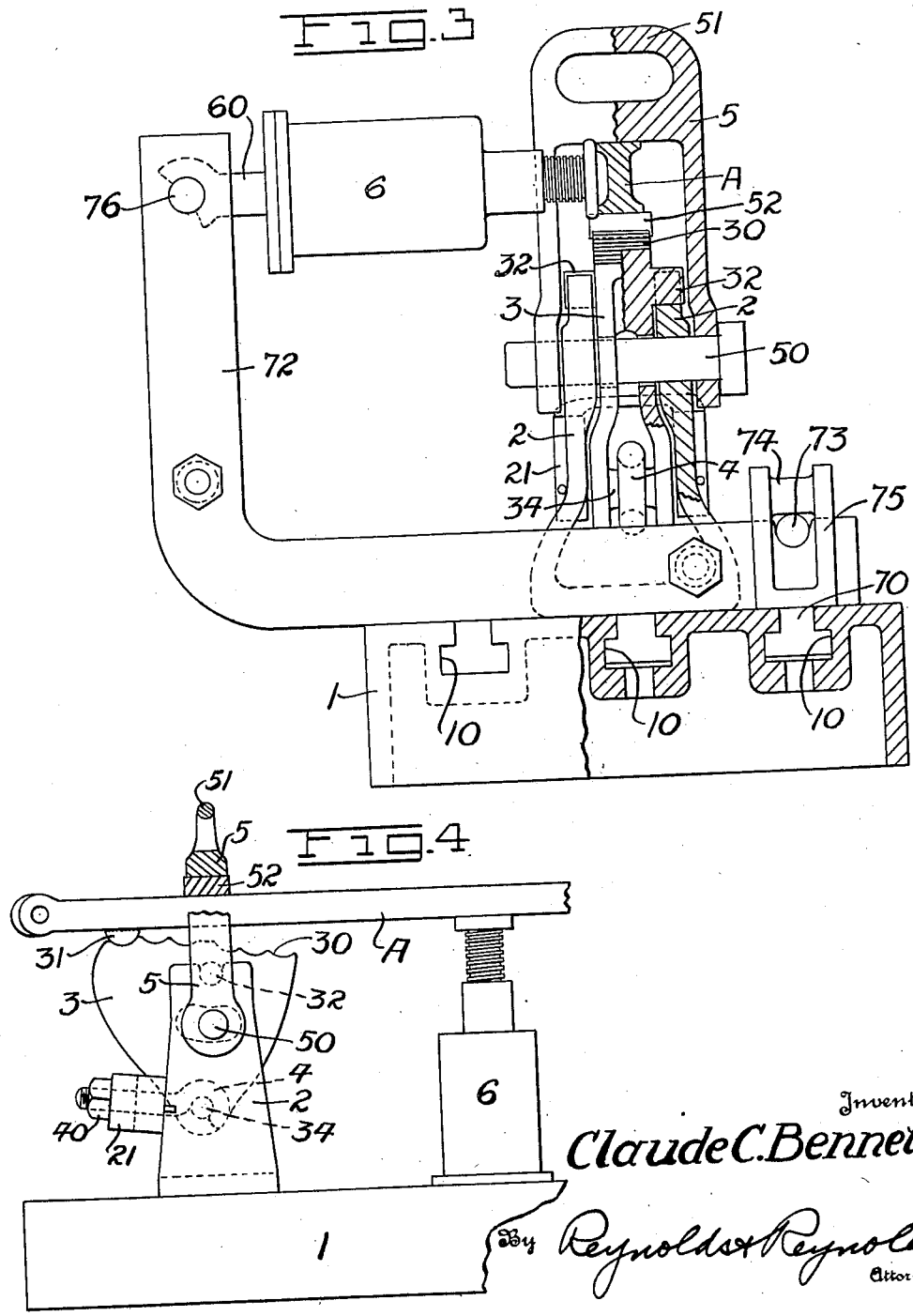

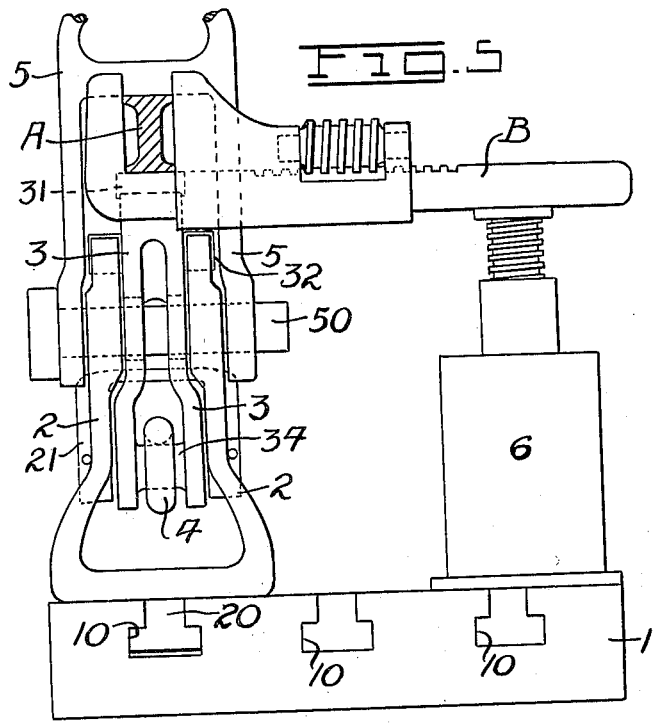
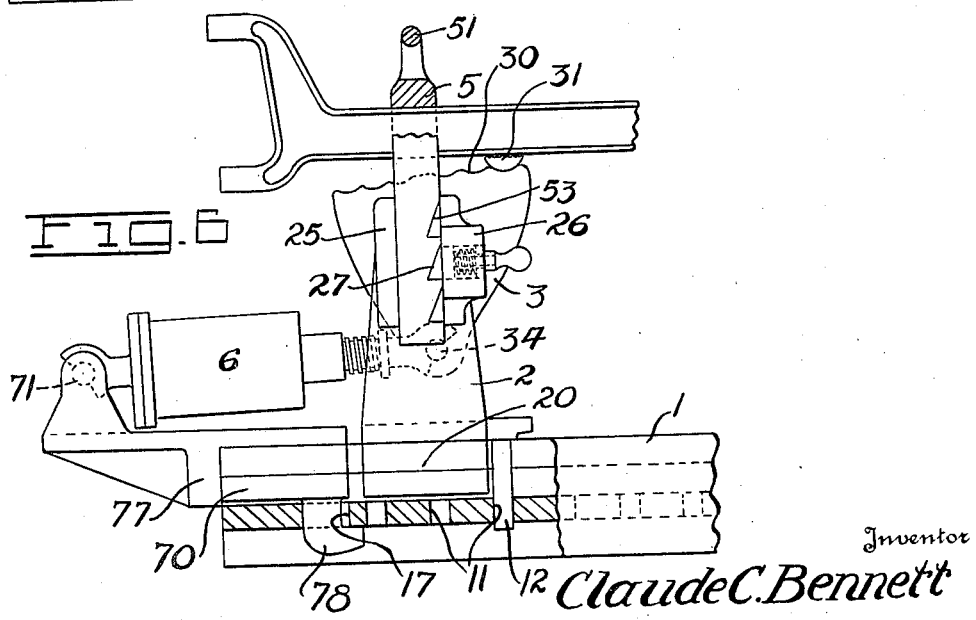

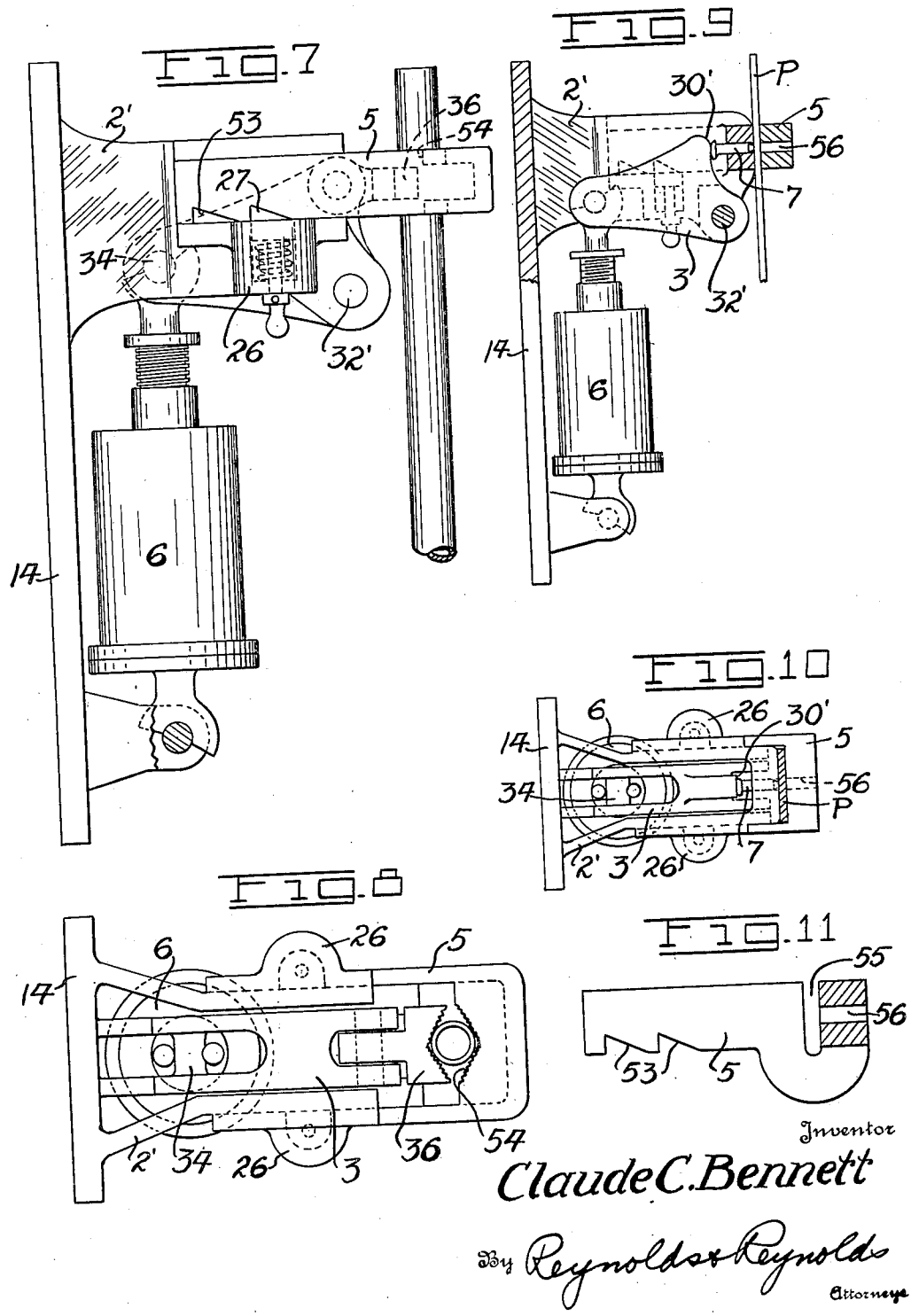

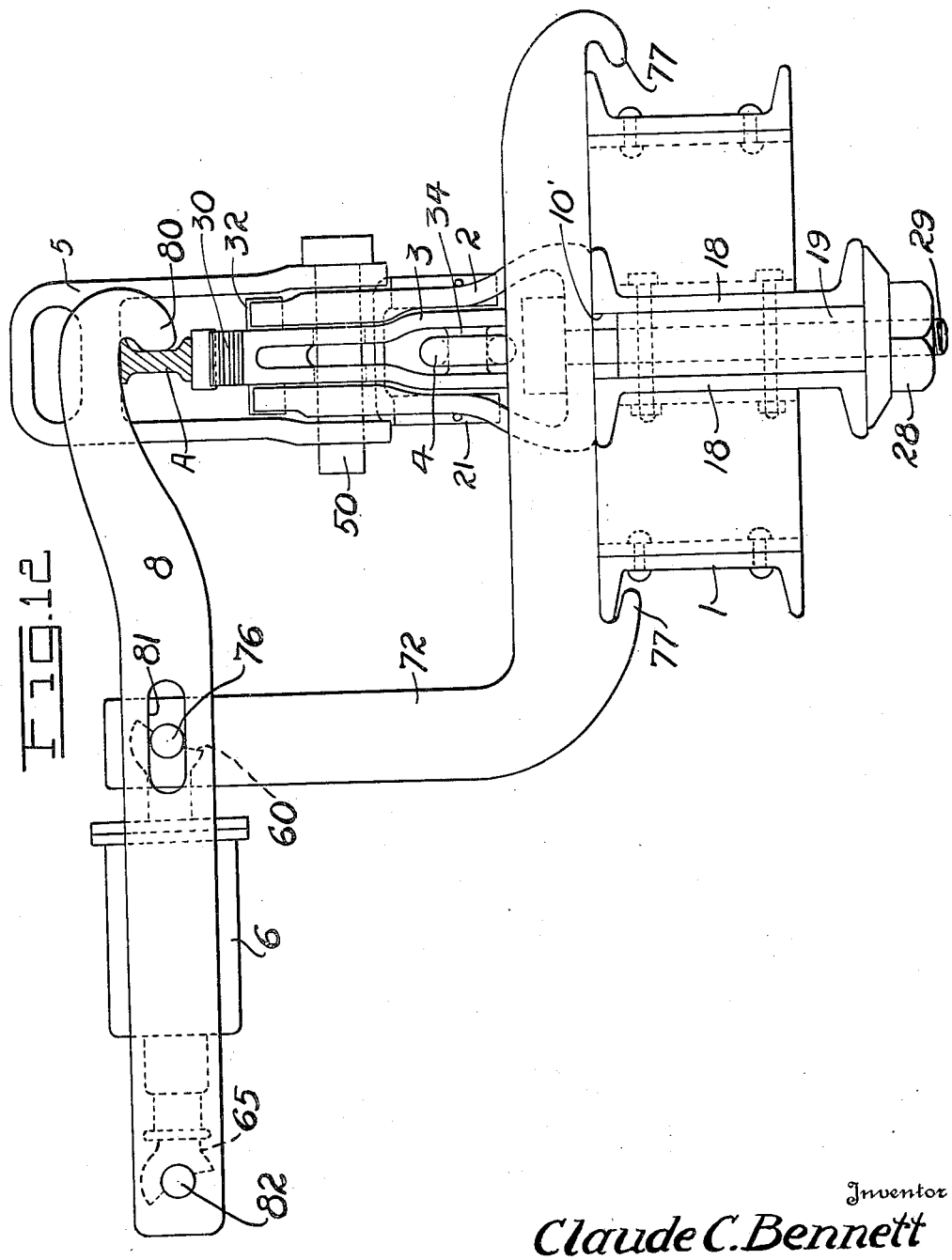

Patented July 21, 1931

1,815,180

UNITED STATES PATENT OFFICE

CLAUDE C. BENNETT, OF SEATTLE, WASHINGTON, ASSIGNOR TO A. E. FERAGEN, INC., OF SEATTLE, WASHINGTON, A CORPORATION OF WASHINGTON

AXLE PRESS

Application filed October 21, 1929. Serial No. 401,222.

My invention relates generally to means for forcing and bending and holding such an object as a bar, pipe, or the like, and it is the particular object of my present invention to devise a means whereby various holding and bending operations can be performed upon an automobile axle or an analogous object. The principles of my invention are applicable, also, to such devices as pipe vises, punch presses, bushing presses, etc.

It is one object of my invention to provide a device of the general character indicated, which may be installed in garages or automotive repair shops, and with which all of the various operations upon an automobile axle, such as bending, twisting, straightening, and the like, may be performed, without the necessity of purchasing or employing separate or additional devices.

It is a further object to provide a device of this character which shall be strong and rugged in construction, and which will be simple to construct and convenient to operate.

Various other objects, and especially such as relate to the purely mechanical details of my invention, will be ascertainable from a study of the drawings forming part of this specification, of the specification itself, and the claims which conclude the same.

In the accompanying drawings I have shown my invention in a form which is now preferred by me, and arranged to perform various operations, and I have also shown various modifications of the principle of my invention, adapted to different purposes.

Figure 3 is in part an end elevation and in part a transverse section through my device, shown in position to bend an axle transversely.

Figure 4 is a side elevation of one end of my device, parts being in section, showing the same arranged to bend an axle transversely in a somewhat different manner.

Figure 5 is an end elevation of my device, shown in position to twist an axle.

Figure 6 is a view of my device in slightly modified form, illustrating the use of the same in connection with an extension means.

Figure 7 is a plan view, and Figure 8 an end elevation, showing the principles of my device applied to a pipe vise.

Figure 9 is a plan view and partial section, and Figure 10 is an end elevation of my device, arranged as a punch press or bushing press, while Figure 11 is a section through the jaw of such an arrangement.

Figure 12 is an end view of a modified form of bender.

In automobile repair shops it is frequently necessary to perform a variety of operations upon automobile axles. These may come in bent at various places and in various ways, both up and down and transversely. The bends may be near the middle or near one or both ends, or the axle may be twisted. By the use of my device, a mechanic may quickly, and with little difficulty, correct any such irregularity in an axle, and incidentally the axle is maintained in such a position that its accuracy may be determined as the bending operations progress by means of gauges applied in the king-pin holes, or to rods centered therein.

Figure 1:
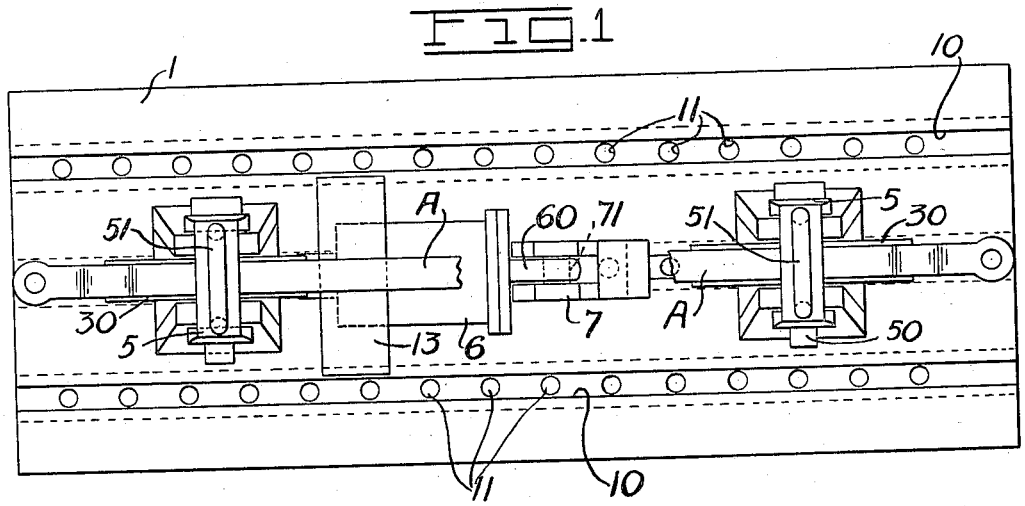
Figure 1 is a general plan view of my invention, showing the same in position to bend one end of an axle in such a manner as to decrease the camber of the wheel which will be mounted thereon.
Figure 2:
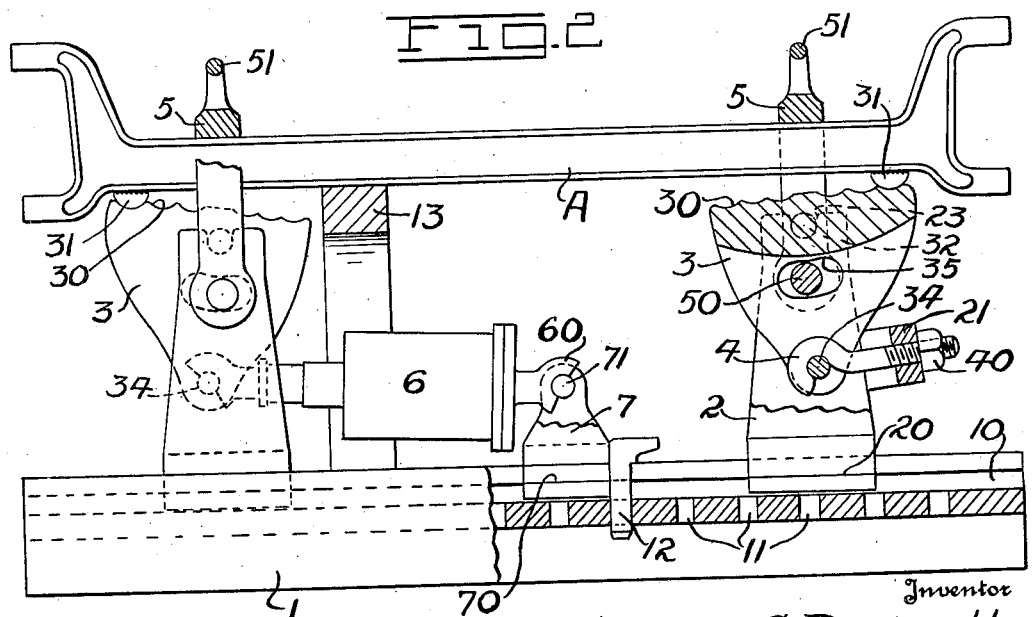
Figure 2 is a general side elevation of the same, with parts broken away in section.

In Figures 1 and 2 I have shown my device arranged to carry out the operation of bending one end of an axle up, in such manner as to decrease the camber of the wheel secured upon that end. The bed plate 1, which is the foundation of my device, may be supported in any suitable manner, but preferably should be fixed upon a stand by means of which it is kept substantially level. This bed plate may be a steel casting, or may be formed of manufactured steel shapes secured together. It has one or more slots 10 in its upper face, which I have shown as T-shaped, and preferably there are three of these, for reasons which will appear hereafter. At intervals in the slots there are provided means for positioning various devices upon the bed plate, these means being, in the form shown, simply perforations 11 in the bottom of the several slots 10.

Received in the slots 10 are the T-heads 20 of bases 2, from which bases are supported the bars or the axle A which is to be operated upon. Associated with these bases are forcing and holding means, and while the holding means may be any that are found suitable or desirable, I prefer that the device be so arranged that these means may be employed for either forcing or holding, at will.

Thus, a jaw 3 is pivotally supported upon the base 2, and to accomplish this the upper end of the base may be provided with a saddle 23, in which are received trunnions 32, projecting somewhat from the opposite faces of the jaw 3. This jaw is provided with a laterally disposed upper surface or shoulder 30, which may have a series of transverse grooves, as is apparent in Figure 2, within a selected one of which is received a bearing block 31. By this means, a bearing may be had against the under side of the axle A, outwardly from the pivotal support 32 of the jaw 3.

To obtain a holding action, I may employ a hook 4, which is engageable with the jaw 3, or with a pin 34 forming part of the jaw. The jaw, in fact, is bifurcated in its lower end, and the pin 34 connects the two separated parts, the hook 4 lying between these lower halves of the jaw, and being received in the base 2 or in a bridge 21, extending between the separated sides of the base 2. By threading down the nut 40, it is possible to cinch up the jaw, or its bearing block 31, against the under side of the axle A. To resist this action I employ a clevis 5, which engages the upper side of the axle, and which is supported from the base 2.

Preferably, this clevis 5 is disposed and engages the axle immediately above the trunnions 32 of the jaw, and its connection with the base is such as to permit its rocking and to permit its ready disengagement. I prefer, therefore, to employ a pin 50, which pin passes through perforations provided therefor in the base 2, and in the lower end of the clevis 5. I prefer that these perforations be located below the trunnions 32, and to avoid interference with movement of the jaw 3 the latter is provided with an arcuate perforation 35, struck upon a radius from the axis of the trunnions 32, whereby the pin 50 may pass through the arcuate slots 35 without engagement or interference therewith, and yet the jaw may rock sufficiently to accomplish its purpose. It is desirable that the clevis 5 be provided with a handle 51 to permit its easy handling.

By the means described or similar means, a bar, axle, pipe, or the like, may be conveniently and securely gripped and held. The same apparatus may be employed to force and bend the same, but when it is desired to bend the axle I prefer to employ a jack, as indicated by the hydraulic jack 6, which engages the pin 34 to force the jaw 2 against the axle, and against the resistance of the clevis 5. The base of such a jack may be supported in any suitable manner, and for convenience I have shown a knee 7, having a T-head 70 received in the T-slots 10, and fixed in position by a pin 12 received in one of the perforations 11. This knee is bifurcated at its upper end and is provided with a pin 71, to receive the hooked base 60 of the jack 6. By these means, or any equivalent means, the jack may be provided with a fixed backing means, against which it can react, to bend the axle.

In Figures 1 and 2 I have shown a bridge-like member consisting of the U-bar 13, engaging beneath the axle A, and resting against the upper surface of the bed plate 1, this U-bar 13 serving to prevent bowing of the axle in the middle instead of bending adjacent the ends.

In Figure 3 the axle is shown as held in such a device as I have heretofore described, but in order to bow it laterally it is necessary that the jack 6, or like member, be supported at one side of the axle, and bear against the side thereof. For this purpose I have shown an angled knee 72, adapted to rest upon the bed plate and to extend transversely thereof, its horizontal arm being suitably held down upon the bed plate, as, for example, by a pin 73 passing beneath the pins 74 of bifurcated knees 75, whose T-heads 70 maintain them in position in one of the outside T-slots 10. The hooked base 60 of the jack engages a pin 76 at the upper end of the upright arm of the knee 72.

In Figure 4 the axle is shown as lying upon its side, held by the jaw 3 and clevis 5, and a jack 6 merely rests upon the upper surface of the bed plate 1 and forces upwardly against the axle. Since the clevises 5 would be normally made of a length to receive the height of the axle, it would be necessary in this case to insert a block 52 between the clevis and the axle.

In Figure 5 is illustrated a twisting operation, the axle A being held by some such gripping means as already described, and being engaged by a large twisting bar B, which may take the form of a large wrench. In this instance, it will be noted, the base 2 is supported in the outermost T-slot 10 of the bed plate, and the jack 6 merely rests upon the bed plate and forces upwardly against the under side of the twisting bar B. The upper surface of the bed plate forms a broad table, upon which such operations can be performed.

In Figure 6, showing one end of an axle being operated upon, it is assumed that the opposite end is held by some such gripping means as has been described, but it is necessary to bend the end of the axle shown, in such manner as to increase the camber of the wheel held thereon. There is not room to perform the bending operation while the jack and its resisting knee are supported within the limits of the bed plate 1—at least, to make the bed plate this long would make it somewhat clumsy, and would require too much floor space. Hence, I have shown an extension knee 77, having the usual T-head 70, but having a hook 78, received in a special hole 17 provided in the end of one of the T-slots, so that the resisting pin 71 of this knee 77 may be positioned outwardly beyond the end of the bed plate 1.

The device as illustrated in Figure 6 differs in other respects from that heretofore described, in that the clevis 5 is adjustably held in the base 2, and does not pivot with respect thereto. The base is provided with a backing flange 25, and in a lug 26 opposite the same is received a spring pressed dog 27, which cooperates with ratchet teeth 53 of the clevis to hold the same in position, and to resist upwardly acting forces. The arms of the clevis slide between the flange 35 and the lug 26 on each side.

The ratchet clevis may be employed in applying my invention to the production of a bench vise or pipe vise, as shown in Figures 7 and 8. In this instance, the movable jaw 54 of the pipe vise is formed within the base of the clevis 5, and the fixed jaw 36 is supported from the jaw member 3. In this form, the pivot 32' is offset from the plane of the clevis 5. The bed plate, in such cases, may be reduced to a mere base plate 14, by means of which the device may be secured upon a wall, a bench, or the like, and the base 2' may be formed integral with the base plate 14.

A similar form may be employed as a punch press or as a bushing press, as is illustrated in Figures 9, 10, and 11. Instead of employing a pair of jaws 36 and 54 to hold a pipe, the clevis is provided with a notched base 55, a perforation 56 intersecting the notch 55. A pin or punch 7, received in the hole 56, will enable a hole to be punched in a plate or bar P, received in the notch 55, or will enable a bushing to be punched out or pressed into place. In this instance the offset shoulder 30' of the jaw 3 bears against the head of the pin 7.

In Figure 12 is shown a modified form of my axle bender, wherein the bed plate 1 is made up of a plurality of structural sections, such as channel bars, held together by suitable spacers, and all bolted into a strong and rigid whole. The slot 10' is formed by a spacer channel or channels 19, between two central channels 18, and since it is not feasible to form this as a T-slot the base 2 is held down by passing a bolt 29 therethrough, and through the slot 10', the bolt being held by a nut 28.

In Figure 12 the device has been illustrated in position to hold or grip an axle A, and there has been illustrated a knee 72, modified only in the manner of securing it upon the bed plate, it having toes 77 turned under at each edge of the bed plate to engage under the flange of the channel bar forming that side of the bed plate. Upon the pin 76 of the knee is supported an extension link 8, having one end hooked, as indicated at 80, to engage the far side of the axle A, and the overhanging end of the link 8 is supported by the pin 76 passing through a slot 81 in the link. It will be understood that ordinarily two such links are employed, these being joined at their outer end by a pin 82. The jack 6 has its hooked end 60 supported on one of the pins 76 or 82, as shown in the drawings upon the former, and its head 65 is hooked, in this form, and is supported on the pin 82, so that, as the jack presses outwardly the axle will be bent to the left, as seen in Figure 12. A bend to the right would be obtained by reversing the position of the knee and jack.

It is believed that the mode of operation of the device will be apparent, and that it will be apparent that the principles thereof may be adapted to various operations by mechanics skilled in its use. The axle is supported well above the bed plate 1, and generally with its king-pin holes free. Gauges may be applied to these holes, or to rods centered therein, and in this manner, merely slacking up on the jack 6 to permit the bowed axle to relax, it is possible to read the inclination of the king-pin holes, both for camber and for caster, and in this and other ways to judge if the bending operations are progressing satisfactorily or have gone far enough. Any reasonable bend may be removed and the king-pin holes gauged without removing the axle from the clamping device; also it is possible to remove or make very short bends, which is so often necessary.

What I claim as my invention is:

1. A gripping and bending apparatus, including a bed plate, a base, means for fixing said base in position upon the bed plate, holding means supported from said base for engaging the upper side of a bar to be held, a jaw pivotally supported from said base, means for forcing said jaw against and under side of such bar, and means for restraining the bar to prevent its bodily movement.

2. An apparatus to grip or bend a bar, including a bed plate, a base, means for fixing said base in position upon the bed plate, a clevis supported from said base and engaging the upper side of a bar to be held, a jaw pivotally supported from said base, and having a laterally disposed, upwardly facing shoulder, means spaced from the jaw and clevis to prevent bodily movement of the bar, and means for forcing said shoulder against the under side of the bar to be held, offset from the engagement of the clevis therewith.

3. A gripping and bending apparatus as in claim 2, the clevis being pivotally supported from the base at a point below and in substantial vertical alignment with the pivotal support of the jaw.

4. A gripping and bending apparatus as in claim 2, the base, clevis, and jaw being perforated below the pivotal support of the jaw, the perforation in the jaw being arcuate on a radius from the latter pivotal support, and a removable pin received in the perforations of the clevis and base, and passing without engagement through the arcuate perforation of the jaw.

5. A gripping and holding apparatus as in claim 2, the shoulder of the jaw having transverse grooves therein at different distances from the jaw's pivot, and a bearing block receivable in a selected groove.

6. A gripping and bending apparatus as in claim 1, the base being bifurcated and having saddles in its upper end at opposite sides, and trunnions projecting at opposite sides of the jaw, and receivable in said saddles.

7. A gripping and bending apparatus as in claim 1, the base being bifurcated and having saddles in its upper end at opposite sides, and trunnions projecting at opposite sides of the jaw, and receivable in said saddles, the holding means comprising a clevis disposed above and outside of the jaw and base, a pin for securing said clevis to the base, said clevis and base being perforated, below and in substantial vertical alignment with said trunnions, to receive said pin.

8. A gripping and bending apparatus as in claim 1, the base being bifurcated and having saddles in its upper end at opposite sides, and trunnions projecting at opposite sides of the jaw, and receivable in said saddles, the jaw being bifurcated at its lower end, and a pin connecting the two sides, the forcing means engaging said pin.

9. A gripping and bending apparatus as in claim 1, the bed plate having T-slots in its upper face, the base having T-heads receivable therein, a knee receivable in said T-slots, means fixing said knee in position, and the forcing means including a jack interposed between said knee and the jaw.

10. A gripping and bending apparatus, including a bed plate having a plurality of bases, means for fixing said bases in position upon said bed plate, a jaw pivotally supported in each base, forcing and holding means associated with each base and jaw, a resisting knee supported from said bed plate, and a jack forcing from said knee to bend a bar held in said jaws.

11. A gripping and bending apparatus as in claim 10, the bed plate having a plurality of T-slots, and the bases and knee having T-heads receivable in said T-slots.

12. A gripping and bending apparatus as in claim 10, the holding means associated with one base and jaw comprising a hook engaging with the jaw and forcing against the base to hold the jaw firmly against the bar to be bent.

13. An apparatus as in claim 2, and in combination therewith, means supported from the bed plate at one side of the bar to be bent, and means reacting from said first means and bearing against the side of said bar, to bend the latter transversely.

14. An apparatus as in claim 2, and in combination therewith, means embracing opposite sides of the bar to be bent, and including a laterally directed arm, and a jack disposed between the bed plate and said arm, to twist the bar.

15. An apparatus to grip or bend a bar, including a bed plate, a base, means for fixing said base in position upon the bed plate, a member vertically movable upon said base to engage the upper side of the bar to be held, ratchet means engageable between said member and the base to hold said member in engagement with the bar, a member engageable with the under side of the bar, spaced along the bar from the point of engagement of the first member therewith, means for restraining the bar, and engaged therewith distant from the aforementioned members, to prevent its bodily movement, and means reacting against the bed plate for forcing that member which engages the under side against the bar.

Signed at Seattle, Washington, this 5th day of October, 1929.

CLAUDE C. BENNETT.